US009395099B2

(12) United States Patent
Edwards et al.

(10) Patent No.: US 9,395,099 B2
(45) Date of Patent: Jul. 19, 2016

(54) WIRELESS DAMPER TESTING AND CONTROL SYSTEM

(71) Applicant: Ruskin Company, Grandview, MO (US)

(72) Inventors: Thomas R. Edwards, Leawood, KS (US); Josiah Wiley, Kansas City, MO (US); Timothy A. Vogel, Independence, MO (US)

(73) Assignee: RUSKIN COMPANY, Grandview, MO (US)

(*) Notice: Subject to any disclaimer, the term of this patent is extended or adjusted under 35 U.S.C. 154(b) by 687 days.

(21) Appl. No.: 13/746,756

(22) Filed: Jan. 22, 2013

(65) Prior Publication Data

US 2014/0203090 A1 Jul. 24, 2014

(51) Int. Cl.

| | |
|---|---|
| ***G05D 7/00*** | (2006.01) |
| ***F24F 13/14*** | (2006.01) |
| ***A62C 2/12*** | (2006.01) |
| ***A62C 37/50*** | (2006.01) |
| *F24F 11/00* | (2006.01) |

(52) U.S. Cl.

CPC ............... *F24F 13/1426* (2013.01); *A62C 2/12* (2013.01); *A62C 37/50* (2013.01); *F24F 2011/0068* (2013.01); *F24F 2011/0098* (2013.01); *F24F 2013/1433* (2013.01); *F24F 2221/52* (2013.01)

(58) Field of Classification Search

CPC .............. F24F 13/1426; F24F 2221/52; F24F 2013/1433; F24F 2011/0098; F24F 2011/0068; A62C 37/50; A62C 2/12

USPC .................... 700/275, 276, 277; 236/49.3, 51

See application file for complete search history.

(56) References Cited

U.S. PATENT DOCUMENTS

| | | | | |
|---|---|---|---|---|
| 4,824,012 | A | 4/1989 | Tate | |
| 4,969,508 | A | 11/1990 | Tate et al. | |
| 6,364,211 | B1 | 4/2002 | Saleh | |
| 6,453,687 | B2 * | 9/2002 | Sharood et al. | 62/127 |
| 6,934,862 | B2 * | 8/2005 | Sharood et al. | 713/300 |
| 7,241,218 | B2 * | 7/2007 | Van Becelaere | F24F 11/0001 454/369 |
| 7,302,959 | B2 * | 12/2007 | Gonia | 454/333 |
| 7,344,089 | B1 * | 3/2008 | Sutterfield | 236/49.3 |
| 2001/0025349 | A1 * | 9/2001 | Sharood et al. | 713/340 |
| 2002/0000092 | A1 * | 1/2002 | Sharood et al. | 62/127 |
| 2002/0022991 | A1 * | 2/2002 | Sharood et al. | 705/14 |
| 2004/0224627 | A1 * | 11/2004 | Becelaere | F24F 11/0001 454/257 |
| 2006/0048525 | A1 * | 3/2006 | Cook | 62/131 |
| 2006/0186213 | A1 * | 8/2006 | Carey et al. | 236/1 B |
| 2007/0013544 | A1 * | 1/2007 | Chiu | 340/825.69 |
| 2007/0220907 | A1 * | 9/2007 | Ehlers | 62/126 |

(Continued)

OTHER PUBLICATIONS

Canadian Patent Office; Office Action; Canadian Patent Application No. 2,803,293, Mar. 13, 2014, 2 pages.

*Primary Examiner* — Charles Kasenge

(74) *Attorney, Agent, or Firm* — Jackson Walker LLP; Christopher J. Rourk

(57) ABSTRACT

A wireless damper control and test system comprising a wireless controller for communicating with a wireless interface using an identifier whereby actuation timing of a damper actuator is transmitted by signal, the wireless interface connected to a damper to be controlled or tested using the transmitted signal, the wireless controller transmits the signals to the wireless interface for operational verification of the damper and damper actuator, and the wireless interface detects a damper state by contacts mounted on the damper and communicates the damper state to the wireless controller.

18 Claims, 4 Drawing Sheets

(56) References Cited

U.S. PATENT DOCUMENTS

2008/0116288 A1* 5/2008 Takach .................... F24F 13/14 236/49.5
2010/0044449 A1* 2/2010 Tessier ................ F24F 11/0086 236/94
2011/0130887 A1* 6/2011 Ehlers, Sr. .................... 700/296
2011/0264275 A1* 10/2011 Thomle ................. F24F 11/006 700/276
2012/0012662 A1* 1/2012 Leen ................... F24F 11/0012 236/51
2013/0068846 A1* 3/2013 Bluestone .................... 236/49.3

* cited by examiner

| CONNECTION | DAMPER CLOSED<br>INSIDE SWITCH | DAMPER OPEN<br>OUTSIDE SWITCH |
|---|---|---|
| COMMON | BLACK/RED | WHITE/RED |
| NORMALLY CLOSED | BLACK YELLOW | WHITE/YELLOW |
| NORMALLY OPEN | BLACK/BLUE | WHITE BLUE |

WIRELESS DAMPER TESTING AND CONTROL SYSTEM

FIELD OF THE INVENTION

The invention relates to a wireless damper testing and control system, and more particularly, to a wireless damper testing and control system comprising a portable controller for communicating with a wireless interface using a predetermined protocol for controlling, detecting and transmitting a device state.

BACKGROUND OF THE INVENTION

Dampers and louvers are critical to the operational performance of HVAC systems in buildings. Such devices maintain building pressurization, prevent the spread of fire or smoke, and prevent water penetration during a tropical storm or hurricane.

Devices installed in critical locations often require operational certification prior to building occupancy. The International Building Code (IBC), along with the International Fire Code (IFC) and National Fire Protection Agency (NFPA) typically require initial inspection and ongoing inspections on a specified schedule after building occupancy. The existing method of testing requires manual operation at the physical product location which may be inaccessible or difficult to access after the building is complete. Such applications often require hard wiring a test switch to every product, or wiring to a control network wired to a central control system. Fire, smoke and combination fire/smoke dampers are used to protect life and limit property loss during a life safety event. A fire/smoke damper is used with a building air handling system as a prevention device for the spread of fire and smoke. Fire/smoke dampers may be designed to meet or exceed Underwriters Laboratories UL555, UL555C, UL555S, National Fire Protection Association, and California State Fire Marshal requirements in walls, ceilings, and floors. In general, these codes and standards require dampers that are able to stop the passage of flames for a period of 1½ or 3 hours and the leakage of smoke for up to 177° C. (350° F.) in smoke-laden air.

Life safety dampers differ from common commercial control dampers in their overall design and materials of construction, mainly through use of high temperature seals. Life safety dampers are also subject to additional testing not required of non-life safety dampers. Non-life safety dampers are tested by temperature feedback or pressure conditions within the overall system (i.e., if the air within a room is not reaching a temperature set point and the doors do not close, the HVAC system, including dampers, must be checked). On the other hand, life safety dampers must be physically inspected for positional certainty.

Representative of the prior art is U.S. Pat. No. 7,241,218 which discloses a fire/smoke damper control system is provided for use in monitoring and controlling operation of one or more fire/smoke dampers in a building. The system includes a local damper controller associated with each fire/smoke damper for controlling the opening and closing of each fire/smoke damper, a remote router for controlling the operation of one or more local damper controllers, and circuit communication between the remote router and each local damper controller. The control system allows for localized power supply for damper actuation, eliminating the pulling of wire from each damper back to a central power panel.

What is needed is a wireless damper testing and control system comprising a portable controller for communicating with a wireless controller using a predetermined protocol for controlling, detecting and transmitting a device state. The present invention meets this need.

SUMMARY OF THE INVENTION

The primary aspect of the invention is to provide a wireless damper testing and control system comprising a portable controller for communicating with a wireless interface using a predetermined protocol for controlling, detecting and transmitting a device state.

Other aspects of the invention will be pointed out or made obvious by the following description of the invention and the accompanying drawings.

The invention comprises a wireless damper control and test system comprising a wireless controller for communicating with a wireless interface using an identifier whereby actuation timing of a damper actuator is transmitted by signal, the wireless interface connected to a damper to be controlled or tested using the transmitted signal, the wireless controller transmits the signals to the wireless interface for operational verification of the damper and damper actuator, and the wireless interface detects a damper state by contacts mounted on the damper and communicates the damper state to the wireless controller.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The inventive system is a standalone wireless system with direct two way communication or indirect mesh communication to satisfy the requirement of manually controlling or testing the functionality of critical application products. In use, personnel responsible for inspection will walk through a building with the wireless remote controller. The handheld controller automatically locates devices within RF range when utilized for direct communication and provides a selectable list to a user on a liquid crystal display. When indirect communication is utilized, the handheld controller provides a selectable list to a user on a liquid crystal display of all devices communicating by mesh network indirectly.

The inventive device can be programmed to sort devices by any desired category including by building name or floor(s) for example. When manual verification testing is complete the tool provides a test report by USB with time stamp and "PASS" or "FAIL" message for each interrogated device.

A wireless damper interface is located next to the critical application device and is wired to the actuator's electrical circuit. The wireless damper interface includes a wireless transceiver for communication, switch contacts to indicate blade position, smoke alarm contact, and a relay to position the connected actuator.

The remote handheld controller sends test request information to individual devices with the preprogrammed actuator timing. After receiving the test information the wireless interface cycles the device being tested to verify operation by reading the blade indication switch contacts. The wireless interface then responds with information to the remote handheld controller with the "PASS" or "FAIL" message with error code information. A "FAIL" message is displayed on the LCD display.

Figure 1:
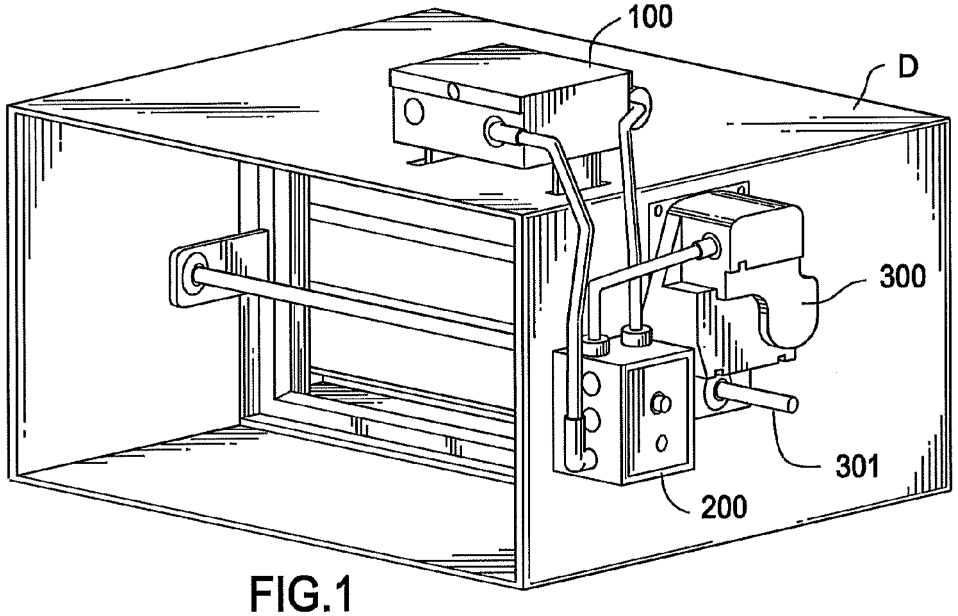
FIG. 1 is a perspective view of the device installed in a damper sleeve.

FIG. 1 is a perspective view of the device installed in a damper sleeve. Interface 100 is mounted to a duct (D) or other suitable mounting surface (S). Interface 100 is connected to junction box 200 which contains the switch contacts and power terminations. Junction box 200 is connected to a damper actuator 300. Junction box 200 may be a pass through for power and switch field connections when the applicable code requires a separate box for such terminations, or it may include internal switch components and/or thermal links. When damper actuator 300 is equipped with internal switches, junction box 200 is not required. When junction box 200 is not required, power and switch wiring may terminate directly to the wireless damper interface (100) enclosure.

Figure 2:
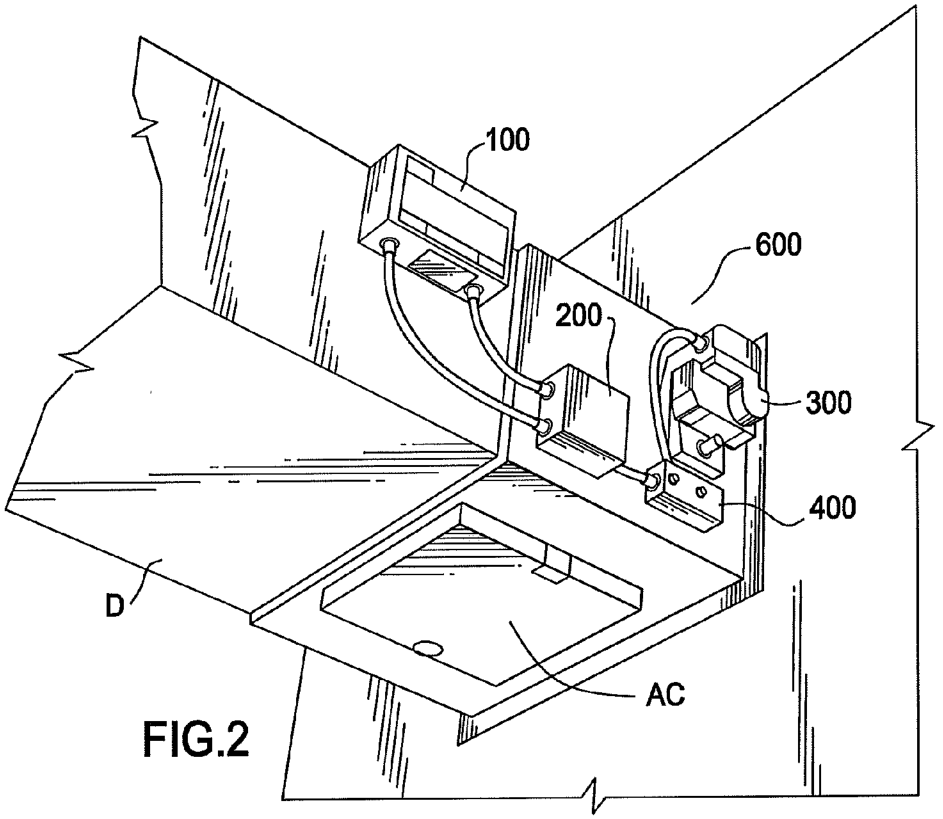
FIG. 2 is a perspective view of the device installed on a duct.

FIG. 2 is a perspective view of the device installed on a duct. The switch package contains contact switches that send a signal when the damper is in the open or closed position. Switches may also be included in the damper actuator. Such switches are well known in the art.

An access door AC may be provided in the duct for accessing the interior of the duct as well as the damper vanes.

Figure 3:
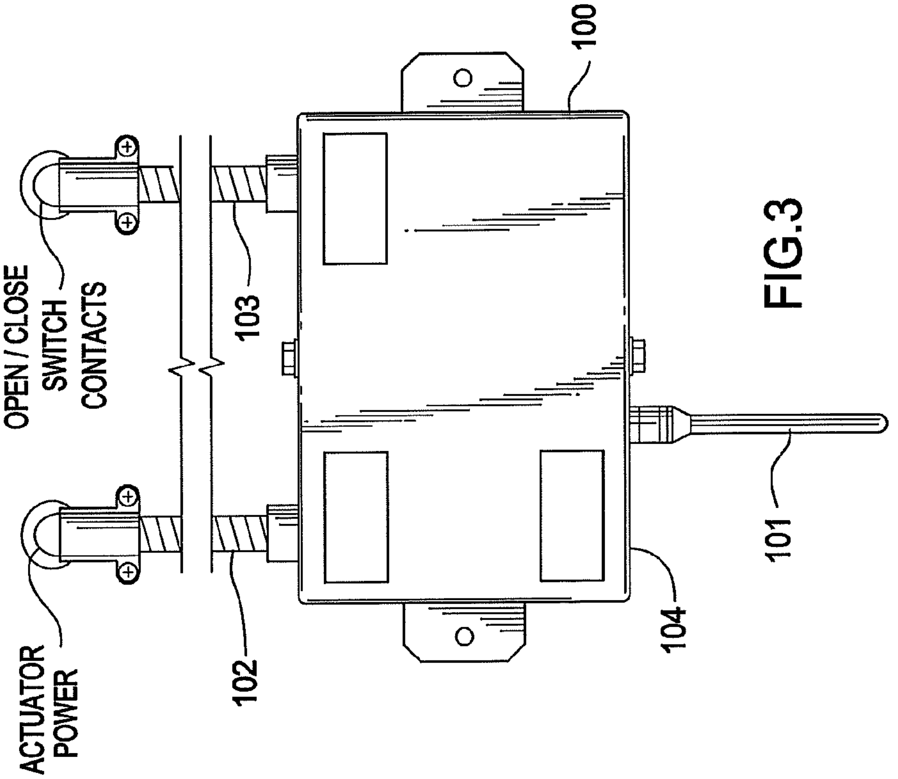
FIG. 3 is a schematic detail of the wireless damper interface.

FIG. 3 is a schematic detail of the wireless damper interface. Interface 100 comprises antenna 101 for receiving RF signals from the portable controller. Actuator power 102 is connected to actuator 300. Switch leads 103 are connected to the damper switch package 400 or to the switches included in the actuator 300. Building power 104 is connected to the interface 100.

Figure 4:
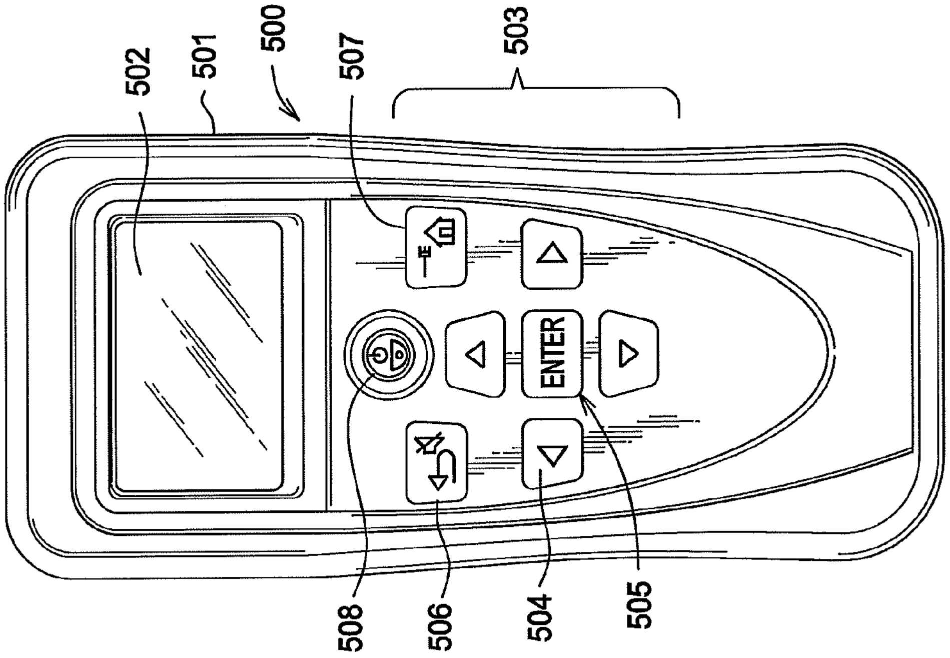
FIG. 4 is a front view of the remote wireless device.

FIG. 4 is a front view of the wireless portable controller. Each interface 100 is encoded with a unique address that identifies that particular damper. While surveying a building, the portable controller 500 "pings" each interface 100. A list of dampers that reply identified by tag and location are displayed on the portable controller LCD visual screen or display 502. Each damper can then be tested using the portable controller 500. Further, new dampers can be added to the roster of active dampers.

All test data is stored in the portable controller for upload to a computer or tablet.

Controller 500 comprises a case 501 and LCD display 502. A keyboard 503 is provided by which a user operates the system. The keys comprise navigation arrows 504, an enter key 505, a return key 506 and a home key 507. Key 508 is for on/off.

The controller is capable of automatic synchronized communication. The system frequency is selected as may be appropriate for the system or installation or both, including but not limited to 2.4 GHz, 915 MHz, 902 MHz, 868.3 MHz or 315 MHz. The operating range of the system is approximately 90 feet with direct communication. When the controller incorporates indirect communication data is transmitted longer distances by "hopping" information between controllers until the information reaches the desired controller selected by the portable controller. For example, the mesh network technology may be based on 802.15.4-2011-IEEE Standard for Local and metropolitan area networks-Part 15.4: Low-Rate Wireless Personal Area Networks (LR-WPANs).

Battery life is typically 21 hours of continuous operation with display LCD backlight. The system includes an automatic switchover between battery and USB. It further includes a USB connection to a PC for communication including generation of a spreadsheet test report.

Figure 5:
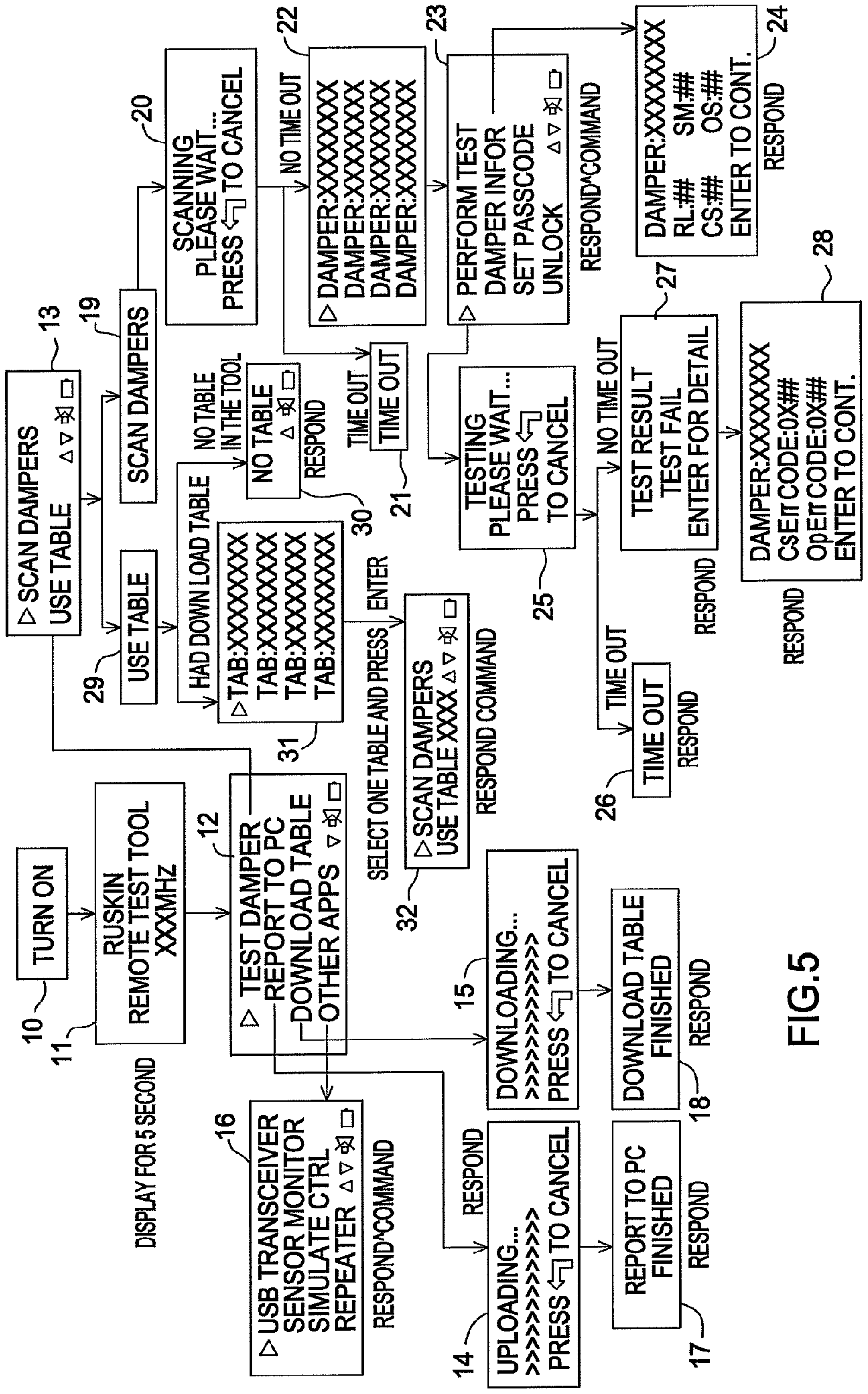
FIG. 5 is a flow chart showing system operation.

FIG. 5 is a flow chart showing system operation. When the portable controller is turned on 10, the introductory text 11 will display for approximately 5 seconds. The next screen 12 offers a menu of options for the user including "Test Damper", "Report to PC", "Download Table", "Other Apps". Selecting "Test Damper" displays the Scan Dampers screen 13. Selecting "Report to PC" displays the "Uploading" screen 14, which displays report to PC finished 17. Selecting the "Download Table" option displays the "Downloading" screen 15, which displays download table finished 18. Selecting the "Other Apps" option displays other options screen 16 which includes USB Transceiver, Sensor Monitor, Simulate Ctrl, Repeater.

On screen 13 if "Scan Dampers" is selected this displays a wait prompt 20. An indication 21 is made if the system times out. If there is no time out, the identified dampers are listed with their respective tag names 22. The tag names are typically limited to 6 characters.

The next screen queries the user to "Perform Test" 23. The device provides detailed damper information for the damper being tested 24. It also displays a "Testing" wait screen 25. In the absence of input a time out screen is displayed 26. If there is no time out a "Test Result" screen is displayed 27. If the test is failed then details are displayed 28.

Returning to screen 13, the user may use a lookup table 29. If there is no table then screen 30 is displayed. The user may also download a table through screen 31. The table name is limited to 16 characters. The user can then scan the downloaded damper table 32.

Figure 6:
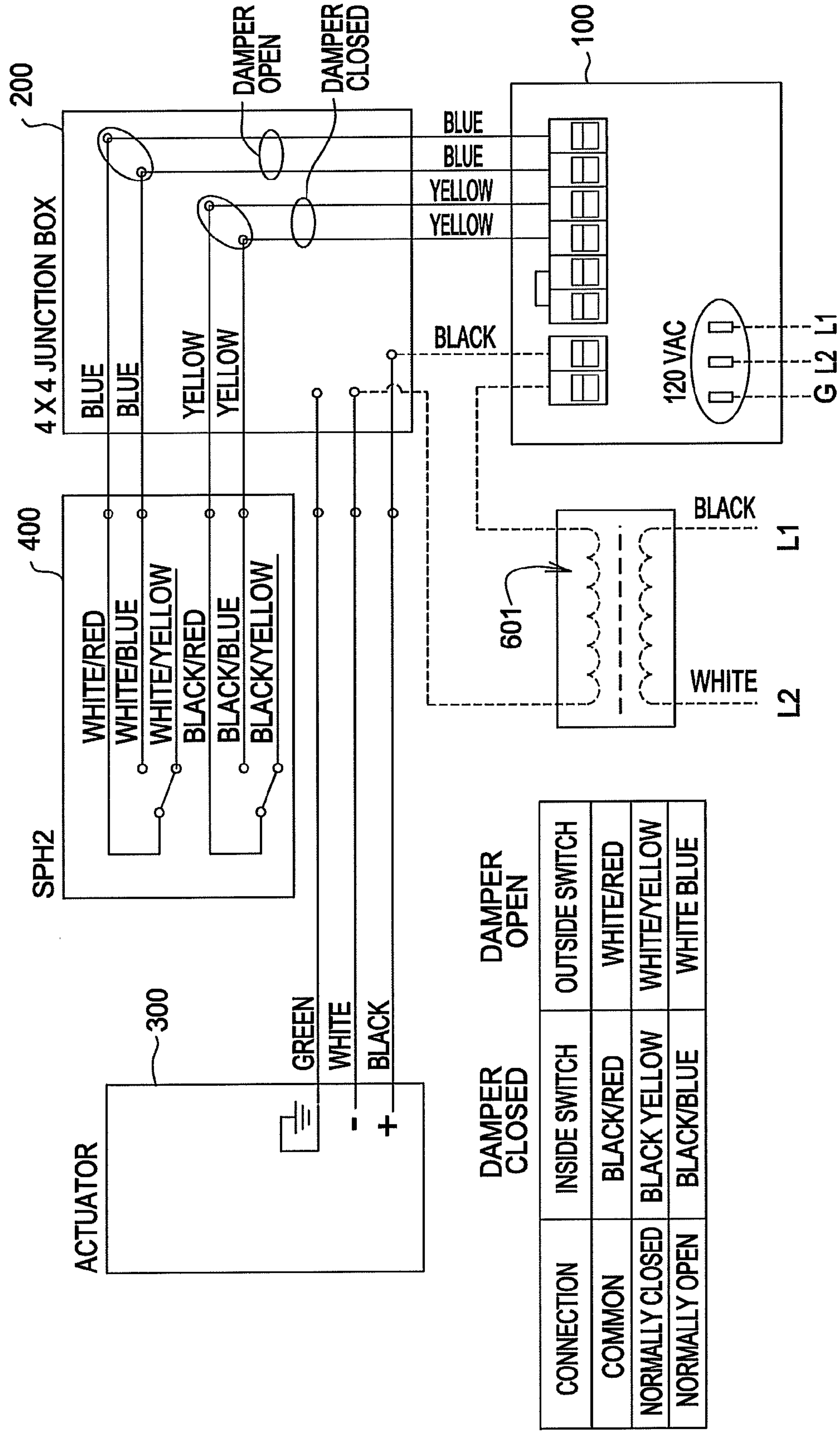
FIG. 6 is an electrical schematic for the damper system.

FIG. 6 is an electrical schematic for the damper system. Wireless interface 100 is connected to junction box 200. Junction box 200 is a pass through for switch and actuator field wiring. In some cases, junction box 200 may not be required. When the applicable code allows, the wiring from actuator 300 and position switches 400 may terminate inside damper interface 100. In other applications, when the actuator is equipped with internal damper blade indication switches, the switch and power wires may terminate inside the wireless damper interface 100 enclosures. Actuator power is provided by a 120/24 VAC transformer 601.

Although a form of the invention has been described herein, it will be obvious to those skilled in the art that variations may be made in the construction and relation of parts without departing from the spirit and scope of the invention described herein.

We claim:

1. A wireless damper system comprising:

a wireless controller for communicating with a wireless interface using an identifier whereby actuation timing of a damper actuator is transmitted by signal;

the wireless interface connected to a damper to be controlled or tested using the transmitted signal;

the wireless controller transmits the signal to the wireless interface for operational verification of the damper and the damper actuator; and the wireless interface detects a damper state by contacts mounted on the damper and communicates the damper state to the wireless controller, wherein the wireless interface is disposed in a first housing and is mounted on a duct and connected to a junction box, and the actuator is disposed in a second housing and is mounted on the duct in a separate location from the first housing and the junction box.

2. The wireless damper system as in claim 1, wherein the wireless controller comprises a visual display.

3. The wireless damper system as in claim 1, wherein the wireless interface comprises a damper blade position switch.

4. The wireless damper system as in claim 1, wherein the wireless controller stores a list of dampers, each damper is identified by a unique identification tag and location.

5. The wireless damper as in claim 1, wherein the wireless controller operates at a frequency of 315 Mhz.

6. The wireless damper system as in claim 1, wherein the wireless interface comprises a damper blade position switch coupled to one or more of the contacts.

7. The wireless damper system as in claim 1, wherein the actuator is a first component and the contacts are a second separate component.

8. The system of claim 1 wherein the wireless interface is disposed in a first housing and is mounted on a duct and connected to a junction box by a first connection for power and a second connection for control, and the actuator is disposed in a second housing and is mounted on the duct in a separate location and is connected to the junction box.

9. The system of claim 1 wherein the wireless interface is disposed in a first housing and is mounted on a duct and connected to a junction box by a first connection for power and a second connection for control, and the actuator is disposed in a second housing and is mounted on the duct in a separate location and is connected to the junction box, and further comprising a damper blade position switch.

10. The system of claim 1 wherein the wireless interface is disposed in a first housing and is mounted on a duct and connected to a junction box by a first connection for power and a second connection for control, and the actuator is disposed in a second housing and is mounted on the duct in a separate location and is connected to the junction box, and further comprising a damper blade position switch disposed in a third housing.

11. The system of claim 1 wherein the wireless interface is disposed in a first housing and is mounted on a duct and connected to a junction box by a first connection for power and a second connection for control, and the actuator is disposed in a second housing and is mounted on the duct in a separate location, and further comprising a damper blade position switch disposed in a third housing and connected to the junction box.

12. The system of claim 1 wherein the wireless interface is disposed in a first housing and is mounted on a duct and connected to a junction box by a first connection for power and a second connection for control, and the actuator is disposed in a second housing and is mounted on the duct in a separate location, and further comprising a damper blade position switch disposed in a third housing and connected to the junction box and the actuator.

13. The system of claim 1 wherein the wireless controller further comprises a plurality of navigation keys and a home key and is configured to allow a user to navigate between a plurality of menus using the navigation keys and to return to a home menu by actuating the home key.

14. The system of claim 13 wherein the plurality of menus includes a "Test Damper" menu.

15. The system of claim 14 wherein the actuation of the "Test Damper" menu initiates a scan of available dampers.

16. A wireless damper system comprising:

a wireless controller for communicating with a wireless interface using an identifier whereby actuation timing of a damper actuator is transmitted by signal;

the wireless interface connected to a damper to be controlled or tested using the transmitted signal;

the wireless controller transmits the signals to the wireless interface for operational verification of the damper and damper actuator; and the wireless interface detects a damper state by contacts mounted on the damper and communicates the damper state to the wireless controller, wherein the wireless interface is disposed in a first housing and is mounted on a duct and connected to a junction box, and the actuator is disposed in a second housing and is mounted on the duct in a separate location and is connected to the junction box.

17. The wireless damper system as in claim 16, wherein the wireless controller stores a list of dampers, each damper is identified by a unique identification tag and location.

18. A wireless damper system comprising:

a wireless controller for communicating with a wireless interface using an identifier whereby actuation timing of a damper actuator is transmitted by signal;

the wireless interface connected to a damper to be controlled or tested using the transmitted signal;

the wireless controller transmits the signals to the wireless interface for operational verification of the damper and damper actuator; and the wireless interface detects a damper state by contacts mounted on the damper and communicates the damper state to the wireless controller, wherein the wireless interface is disposed in a first housing and is mounted on a duct and connected to a junction box by a plurality of conduits, and the actuator is disposed in a second housing and is mounted on the duct in a separate location and is connected to the junction box.

* * * * *